(12) United States Patent
DePue et al.

(10) Patent No.: US 7,219,922 B2
(45) Date of Patent: May 22, 2007

(54) INTERIOR VEHICLE TRIM PANEL

(75) Inventors: Todd DePue, Brighton, MI (US);
Glenn A. Cowelchuk, Chesterfield Township, MI (US); Michael J. Hier, Milford, MI (US)

(73) Assignee: Lear Corporation, Southfield, MI (US)

( * ) Notice: Subject to any disclaimer, the term of this patent is extended or adjusted under 35 U.S.C. 154(b) by 137 days.

(21) Appl. No.: 10/429,411

(22) Filed: May 5, 2003

(65) Prior Publication Data

US 2004/0222619 A1    Nov. 11, 2004

(51) Int. Cl.
B60R 21/16    (2006.01)

(52) U.S. Cl. ...................................... 280/732

(58) Field of Classification Search ............... 464/181, 464/183, 903; 180/379; 138/141, 143, DIG. 1, 138/DIG. 7; 280/732, 728.3, 728.1
See application file for complete search history.

(56) References Cited

U.S. PATENT DOCUMENTS

| | | | |
|---|---|---|---|
| 5,421,608 A | | 6/1995 | Parker et al. |
| 5,447,328 A | | 9/1995 | Iannazzi et al. |
| 5,501,890 A | * | 3/1996 | Mills ........................... 428/68 |
| 5,590,901 A | * | 1/1997 | MacGregor .............. 280/728.3 |
| 5,783,016 A | | 7/1998 | Gallagher et al. |
| 5,803,487 A | * | 9/1998 | Kikuchi et al. .......... 280/728.2 |
| 5,845,931 A | | 12/1998 | Nagy et al. |
| 6,012,735 A | | 1/2000 | Gray et al. |
| 6,076,851 A | * | 6/2000 | Davis et al. ............. 280/728.2 |
| 6,145,871 A | * | 11/2000 | Davis et al. ............. 280/728.2 |
| 6,203,056 B1 | | 3/2001 | Labric et al. |
| 6,250,669 B1 | | 6/2001 | Ohmiya |
| 6,322,101 B1 | | 11/2001 | Suizu et al. |
| RE37,540 E | | 2/2002 | Iannazzi et al. |
| 6,440,514 B1 | | 8/2002 | Ueno et al. |
| 6,533,312 B1 | * | 3/2003 | Labrie et al. ............. 280/728.2 |
| 6,644,685 B2 | * | 11/2003 | Sun et al. ................. 280/728.3 |
| 6,742,804 B2 | * | 6/2004 | Suzuki et al. ............ 280/728.3 |
| 6,753,057 B1 | * | 6/2004 | Gardner, Jr. ................. 428/43 |
| 2001/0026063 A1 | | 10/2001 | Yokota |
| 2002/0074776 A1 | | 6/2002 | Labrie et al. |
| 2004/0026902 A1 | * | 2/2004 | Yasuda et al. ........... 280/728.2 |

FOREIGN PATENT DOCUMENTS

| | | |
|---|---|---|
| EP | 0 748 722 | 12/1996 |
| EP | 1 086 863 | 3/2001 |
| FR | 2 799 700 | 4/2001 |

* cited by examiner

*Primary Examiner*—Faye M. Fleming
(74) *Attorney, Agent, or Firm*—MacMillan, Sobanski & Todd, LLC

(57) ABSTRACT

An interior vehicle trim panel includes a substrate having a front face and an under face. The under face has a tear seam to allow an airbag to exit the substrate when the airbag is deployed. The tear seam defines an airbag door. The outer layer is bonded to the front face of the substrate. A portion of the outer layer defines a hinge member for the airbag door. The outer layer is preferably mechanically bonded to the substrate in a mold, thereby forming an overmolded interior vehicle trim panel. Preferably, the hinge member of the outer layer is thicker relative to a region of the outer layer adjacent the airbag door.

20 Claims, 4 Drawing Sheets

INTERIOR VEHICLE TRIM PANEL

TECHNICAL FIELD

This invention relates to interior vehicle trim panels. More particularly, the invention relates to an improved seamless airbag door in an interior vehicle trim panel.

BACKGROUND OF THE INVENTION

Incorporation of airbags into vehicles has created many design challenges for automotive designers. It is desirable to incorporate an airbag into an instrument panel in front of the vehicle passenger seat. When incorporating an airbag into an instrument panel it is necessary to provide an airbag cover portion in the instrument panel that will reliably and safely tear, such that the passenger is protected. To this end, a tear seam has generally been provided in the airbag cover portion of an instrument panel to insure that the airbag will safely deploy.

Vehicle designers prefer to have a continuous surface on the front face of the instrument panel whenever possible, so they would prefer to avoid having a tear seam in the instrument panel. Thus, recently there has been an effort to achieve a "seamless" design wherein there is no indication on the front face of the instrument panel that the airbag is behind the instrument panel. To achieve this design, tear seams or tear strips provided in the instrument panel are only provided on the under face, and not on the front face of the instrument panel.

The instrument panel must perform the utilitarian function of breaking apart along its tear seam to allow the air bag to exit through the airbag cover portion of the instrument panel when deployed. The airbag cover portion of the instrument panel is often complex and can include a relatively rigid hinge, such as a steel hinge.

It is, however, desirable to provide an improved airbag cover portion of an instrument panel. Preferably, such an improved cover portion would be less complex, have fewer components, and therefore be easier to assemble than known airbag cover portions of instrument panels.

SUMMARY OF THE INVENTION

This invention relates to an interior vehicle trim panel. The trim panel includes a substrate having a front face and an under face. The under face has a tear seam to allow an airbag to exit the substrate when the airbag is deployed. The tear seam defines an airbag door. The outer layer is bonded to the front face of the substrate. A portion of the outer layer defines a hinge member for the airbag door. The outer layer is preferably mechanically bonded to the substrate in a mold, thereby forming an overmolded interior vehicle trim panel. Preferably, the hinge member of the outer layer is thicker relative to a region of the outer layer adjacent the airbag door.

Various objects and advantages of this invention will become apparent to those skilled in the art from the following detailed description of the preferred embodiment, when read in light of the accompanying drawings.

DETAILED DESCRIPTION OF THE INVENTION

Figure 1:
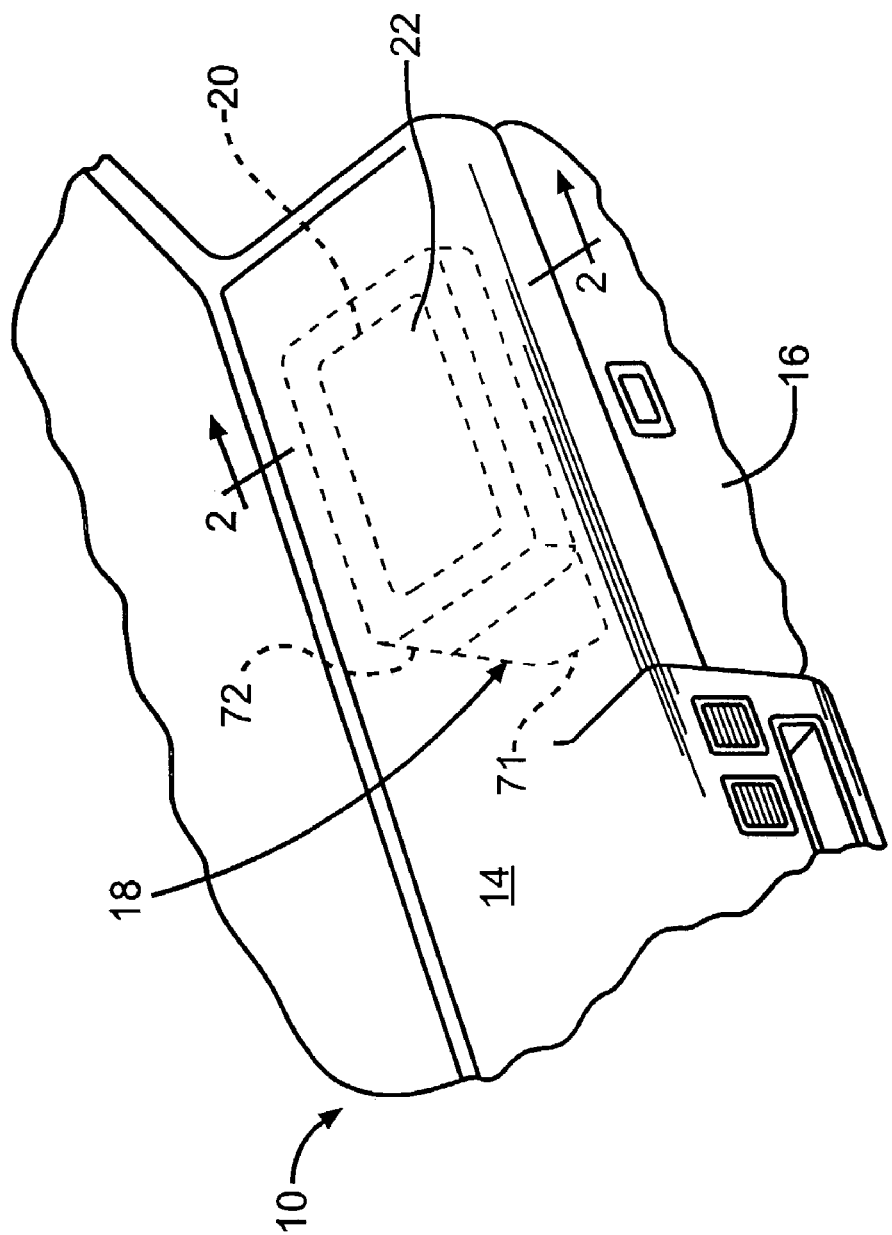
FIG. 1 is a partial perspective view of an instrument panel manufactured according to the invention.

Referring now to the drawings, there is illustrated in FIG. 1, an instrument panel, indicated generally at 10. The instrument panel 10 is an example of a trim panel for mounting in an interior cabin of a vehicle. It will be appreciated however, that the trim panel 10 of the subject invention may be any type of trim panel associated with a vehicle. Other suitable examples of trim panels include door panels, center consoles, overhead consoles, and other various interior panels for covering the sides, ceilings, and/or vertical pillars of the frame members of the vehicle.

The instrument panel 10 is installed on a vehicle frame generally in the area underneath the windshield and between the engine compartment and the interior of the vehicle. The instrument panel 10 can include any suitable frame structure (not shown) for supporting the instrument panel 10 to the vehicle frame. The portion of the exemplary instrument panel 10 illustrated in FIG. 1 includes a show, or front face 14 and a glove box 16. Since the front face 14 of the instrument panel 10 are within reach and direct sight of the occupants of the vehicle, it is desirable for this portion of the instrument panel 10 to be aesthetically pleasing in color and texture, as well as having a desirable tactile feel, such as a soft of slightly elastic feel.

Figure 2:
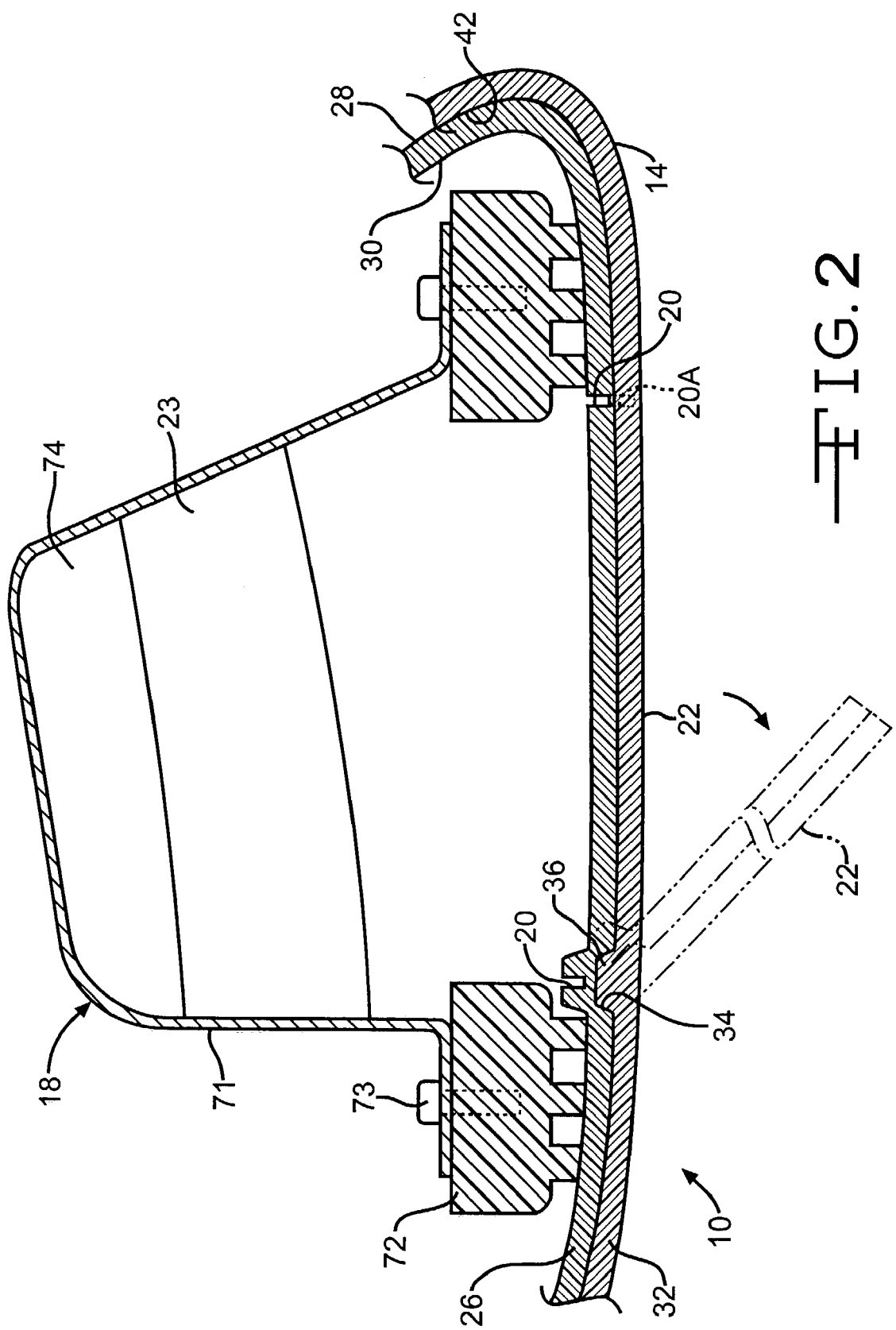
FIG. 2 is a cross-sectional view of a portion of the instrument panel taken along line 2-2 of FIG. 1, showing the airbag door.
Figure 4:
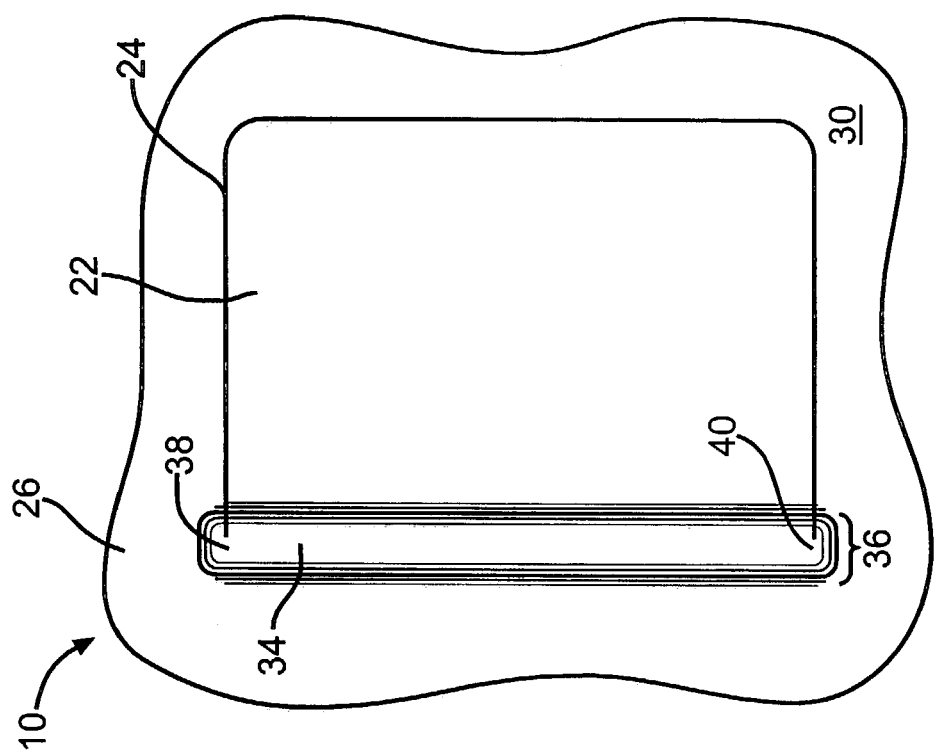
FIG. 4 is a bottom plan view of an alternate embodiment an instrument panel manufactured according to the invention, showing an alternate embodiment of the tear seam.
Figure 3:
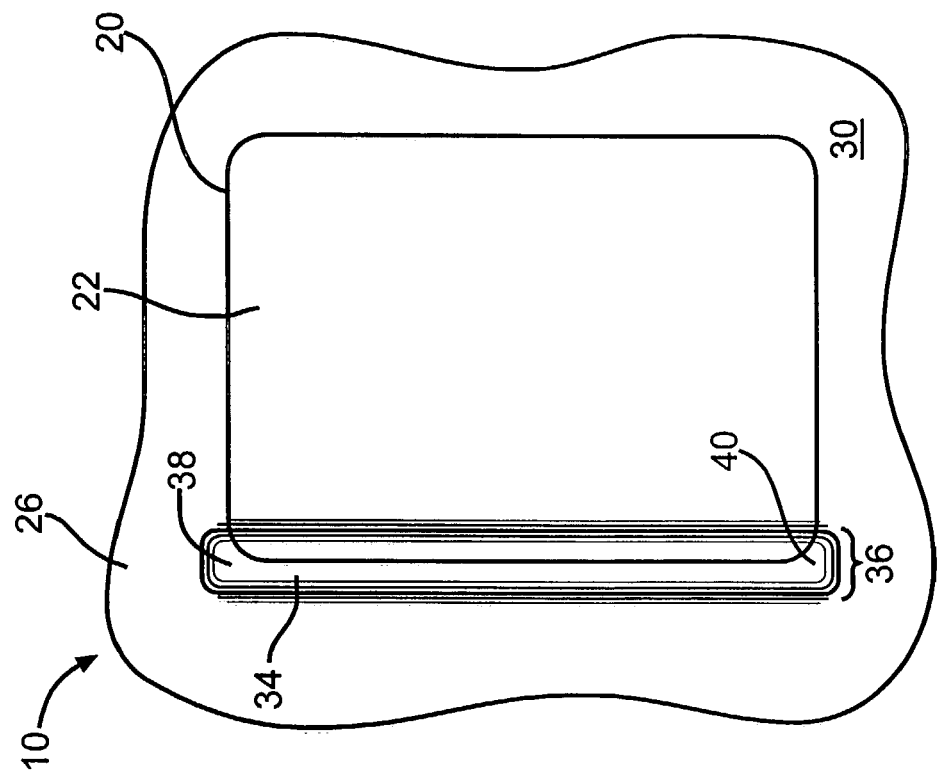
FIG. 3 is a bottom plan view of the instrument panel illustrated in FIG. 1, showing the tear seam and the hinge groove.

Shown in phantom outline in FIG. 1 is an airbag support assembly 18 and a tear seam 20 located behind the front face 14 of the instrument panel 10. Preferably, the tear seam 20 defines an airbag door 22. It will be appreciated that the tear seam 20 can be any weakened area of the instrument panel 10, such that an airbag 23, as shown in FIG. 2, can exit the instrument panel 10 when the airbag 23 is deployed, for example, during a vehicle collision. As shown in FIGS. 1 and 3, the tear seam 20 has a substantially rectangular shape. However, it will be appreciated that the tear seam 20 can be of any desired shape, such as a U-shaped tear seam 24, as shown in FIG. 4, or H-shaped. The tear seam 20 can be formed by any desired method. Preferably, the tear seam 20 is formed by laser scoring.

As shown in FIG. 2, the instrument panel 10 includes a substrate 26 and an outer layer 32. The substrate 26 includes a front face 28 and an under face 30. The outer layer 32 generally covers the front face 28 of the substrate 26. Portions of the substrate 26 may be exposed and viewable by passengers of the vehicle. The substrate 26 and the outer layer 32 can have any suitable contour and apertures for receiving various vehicle controls, components and systems.

The substrate 26 is preferably made of a relatively rigid material. Preferably, the instrument panel 10 is made of a polymer or plastic material. Examples of suitable materials for the instrument panel 10 include thermoplastic elastomer, thermoplastic elastomer polyolefin, polycarbonate, polypropylene, ABS (acrylonitrile butadiene styrene), polycarbonate ABS, SMA (styrene maleic anhydride), polyphenylene oxide (PPO), nylon, polyester, acrylic, and polysulfone. More preferably, the substrate 26 is formed of a molded plastic material, such as thermoplastic olefin (TPO). However, it will be appreciated that the substrate 26 can be formed of any other desired material. The substrate 26 can also have any suitable textured surface and color. The tear seam 20 is formed in the under face 30 of the substrate 26. A hinge groove 34 can be formed in the front face 28 of the substrate 26. Preferably, the hinge groove 34 is formed opposite a portion of the tear seam 20.

An outer layer 32 is bonded to the front face 28 of the substrate 26. A portion of the outer layer 32 within the hinge groove 34 of the substrate defines a hinge member 36 having a first end 38 and a second end 40. Preferably the hinge member 36 is thicker relative to the rest of the outer layer 32. The outer layer 32 is preferably made of a softer material than the substrate 26 and has a generally soft tactile feel compared to the substrate 26. Preferably, the outer layer 32 is made of a polymer or synthetic rubber. Examples of suitable materials for the outer layer 32 include thermoplastic elastomer, thermoplastic elastomer polyolefin. The outer layer 32 can also have any suitable textured surface and color. Preferably, the outer layer 32 is of a different material than the substrate 26 so that the surface of the outer layer has a different tactile characteristic than the surface of the substrate 26. For example, the substrate 26 can have a lower coefficient of friction than the outer layer 32. More preferably, the outer layer is formed of thermoplastic elastomer (TPE) that forms an outer decorative surface of the instrument panel 10.

The outer layer 32 can be bonded to the substrate 26 by any desired method. Preferably, the outer layer 32 is mechanically bonded to the substrate 26 in a mold. More preferably, the outer layer 32 is mechanically bonded to the substrate 26 in a two-shot injection mold, thereby defining an overmolded instrument panel 10. It will be appreciated that the outer layer 32 can be bonded to the substrate 26 by any other desired method, such as by spraying the outer layer 32 onto the front face 28 of the substrate 26.

The outer layer 32 defines the front face 14 of the instrument panel 10, and includes an under face 42. As shown in FIG. 2, a portion of the tear seam 20 can extend through the substrate 26 to the under face 30 of the outer layer 32. If desired, the tear seam can also extend through a portion of the outer layer 32, as shown by a phantom outline 20A. However, it will be appreciated that, preferably, the tear seam 20 does not extend into or through the hinge member 36 of the outer layer 32.

When the U-shaped tear seam 24, as shown in FIG. 4, is provided, the tear seam 44 preferably extends between the first and the second ends 38 and 40, respectively, of the hinge member 36, such that an open end of the U-shaped tear seam 44 defines the hinge member 36.

It will be appreciated that the substrate 26 can also be formed without the hinge groove 34, such that the outer layer 32 bonded thereto has a substantially uniform thickness. In such a substantially uniformly thick outer layer 32, the hinge member 36 is defined as a portion of the outer layer 32 adjacent (below as viewed in FIG. 2) a portion of the tear seam 20.

It will be further appreciated that various covers and panels (not shown) may be also be attached to the substrate 26 or the outer layer 32 to cover selected positions thereof. For example, an aesthetically pleasing trim panel, such as a faux wood or carbon fiber panel (not shown) may be used to cover a portion of the substrate 26. Other components, such as vent covers, display devices, electronic controls, audio/video entertainment units, and the like may be attached to the substrate 26 of the instrument panel 10.

Figure 5:
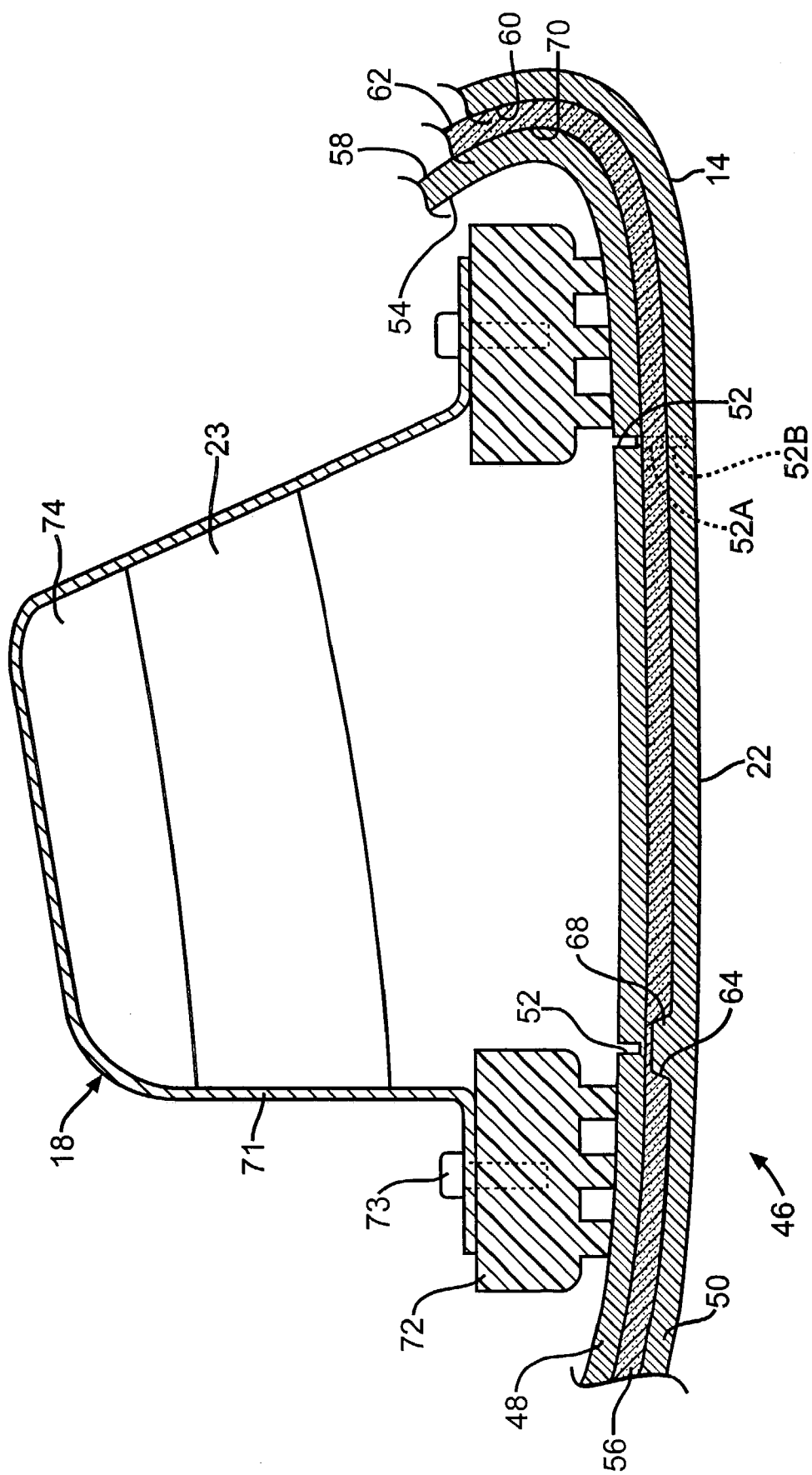
FIG. 5 is a cross-sectional view of a portion of an alternated embodiment of an instrument panel, showing the airbag door.

An alternate embodiment of the instrument panel is illustrated generally at 46 in FIG. 5. The instrument panel 46 includes a substrate 48 and an outer layer 50. A tear seam 52 is formed in an under face 54 of the substrate 48. A layer of a suitable energy absorbing elastomeric foam 56, such as urethane foam that forms a cushion in an underlying relationship to the outer layer 50, is bonded to a front face 58 of the substrate 48 and an under face 60 of the outer layer 50. The instrument panel 46 can be formed by any desired method, such as foam in place molding, laminate injection molding, and the like. The outer layer 50 can also be spayed onto a front face 62 of the layer of foam 56.

A hinge groove 64 can be formed in the front face 62 of the layer of foam 56. Preferably, the hinge groove 64 is formed opposite a portion of the tear seam 52. A portion of said outer layer 50 within the hinge groove 64 of the layer of foam 56 defines a hinge member 68.

As shown in FIG. 5, a portion of the tear seam 52 can extend through the substrate 26 to an under face 70 of the layer of foam 56. The tear seam can also extend through a portion of the layer of foam 56, as shown by phantom outline 52A. If desired, the tear seam 52 can also extend through a portion of the layer of outer layer 50, as shown by a phantom outline 52B. However, it will be appreciated that preferably, the tear seam 52 does not extend into or through the hinge member 36 of the outer layer 50.

It will be appreciated that the substrate 48 can also be formed without the hinge groove 64, such that the outer layer 50 bonded to the layer of foam 56 has a substantially uniform thickness. In such a substantially uniformly thick outer layer 50, the hinge member 68 is defined as a portion of the outer layer 50 adjacent (below as viewed in FIG. 5) a portion of the tear seam 52.

As best shown in FIGS. 2 and 5, is the airbag support assembly 18 includes an airbag housing 71 and an airbag collar 72. The airbag collar 72 is attached to the under face 30 of the substrate 26 about the tear seam 20. The collar 72 is preferably formed of a molded plastic material, such as TPO. However, it will be appreciated that the collar 72 can be formed of any other desired material. The collar 72 is attached to the substrate 26 by any desired method, such as by vibration welding. It will be appreciated however, that the collar 72 can be attached to the substrate 26 by any other desired attachment method.

Preferably, the air bag housing 71 is attached to the collar 72 with threaded fasteners 73. However, threaded fasteners 73 are not required, and the air bag housing 71 can be attached to the collar 72 by any desired attachment means. The airbag housing preferably includes an airbag inflator 74 and an airbag 23. The airbag inflator 74 and the airbag 23 are shown schematically for illustration purposes since they are known in the art and their construction forms no part of the invention. As will be understood by one of ordinary skill in the art, the shape of the airbag housing 71, airbag inflator 74, and airbag 23 may vary from that shown.

As best shown in FIG. 2, when the airbag 23 deploys it will initially be forced against the under face 30 of the airbag door 22. The airbag 23 then ruptures the instrument panel 10 along the tear seam 20 such that the airbag door 22 (the portion of the instrument panel 10 within the outline of the tear seam 20) separates from the rest of the instrument panel 10 and moves outward of the instrument panel 10. The hinge member 36 of the outer layer 32 permits the airbag door 22 to rotate outwardly so that the airbag 23 can be released into the passenger compartment of the vehicle. During and after deployment of the airbag 23 the airbag door 22 remains attached to the instrument panel 10 by the hinge member 36 of the outer layer 32.

The principle and mode of operation of this invention have been described in its preferred embodiments. However, it should be noted that this invention may be practiced otherwise than as specifically illustrated and described without departing from its scope.

What is claimed is:

1. An interior vehicle trim panel comprising:
   a substrate having a front face and an under face, said under face having a tear seam to allow an airbag to exit said substrate when said airbag is deployed, said tear seam defining an airbag door; and
   an outer layer bonded to said front face of said substrate, a portion of said outer layer defining a hinge member for said airbag door,
   wherein said hinge member of said outer layer is thicker relative to a region of said outer layer adjacent said airbag door.

2. The trim panel according to claim 1, wherein said outer layer is mechanically bonded to said substrate in a mold, thereby forming an overmolded interior vehicle trim panel.

3. The trim panel according to claim 1, wherein said outer layer is sprayed on to said front face of said substrate.

4. The trim panel according to claim 1, wherein said hinge member of said outer layer is thicker relative to a region of said outer layer adjacent said airbag door.

5. The trim panel according to claim 1, wherein said outer layer includes a front face and an under face, wherein said hinge member has a first end and a second end, and wherein a portion of said tear seam extends through said substrate to said under face of said outer layer, said portion of said tear seam in said outer layer extending between said first and said second ends of said hinge member.

6. The trim panel according to claim 1, wherein said tear seam is substantially U-shaped, an open end of said U-shaped tear seam defining said hinge member.

7. The trim panel according to claim 1, further including an airbag collar attached to said under face of said substrate about said airbag door.

8. The trim panel according to claim 7, wherein an airbag housing attached to said airbag collar.

9. The trim panel according to claim 1, wherein said trim panel is instrument panel.

10. The trim panel according to claim 1, wherein said tear seam is formed by a laser.

11. The trim panel according to claim 1, wherein when said airbag is deployed, said hinge member of said outer layer remains attached to said substrate.

12. The trim panel according to claim 1, wherein further including a resilient foam material between said substrate and said outer layer.

13. The trim panel according to claim 12, wherein a portion of said tear seam extends through said foam material to an under face of said outer layer.

14. An interior vehicle trim panel comprising:
   a substrate having a front face and an under face, said under face having a tear seam to allow an airbag to exit said substrate when said airbag is deployed, said tear seam defining an airbag door;
   an outer layer bonded to said front face of said substrate; and
   a hinge member defined by a portion of said outer layer, said hinge member being thicker relative to a region of said outer layer adjacent said airbag door.

15. The trim panel according to claim 14, wherein said outer layer includes a front face and an under face, wherein said hinge member has a first end and a second end, and wherein a portion of said tear seam extends through said substrate to said under face of said outer layer, said portion of said tear seam in said outer layer extending between said first and said second ends of said hinge member.

16. The trim panel according to claim 14, wherein said tear seam is substantially U-shaped, an open end of said U-shaped tear seam defining said hinge member.

17. The trim panel according to claim 14, further including an airbag collar attached to said under face of said substrate about said airbag door.

18. The trim panel according to claim 17, wherein an airbag housing attached to said airbag collar.

19. The trim panel according to claim 14, wherein said trim panel is instrument panel.

20. The trim panel according to claim 14, wherein said tear seam is formed by a laser.

* * * * *